Figure 1:
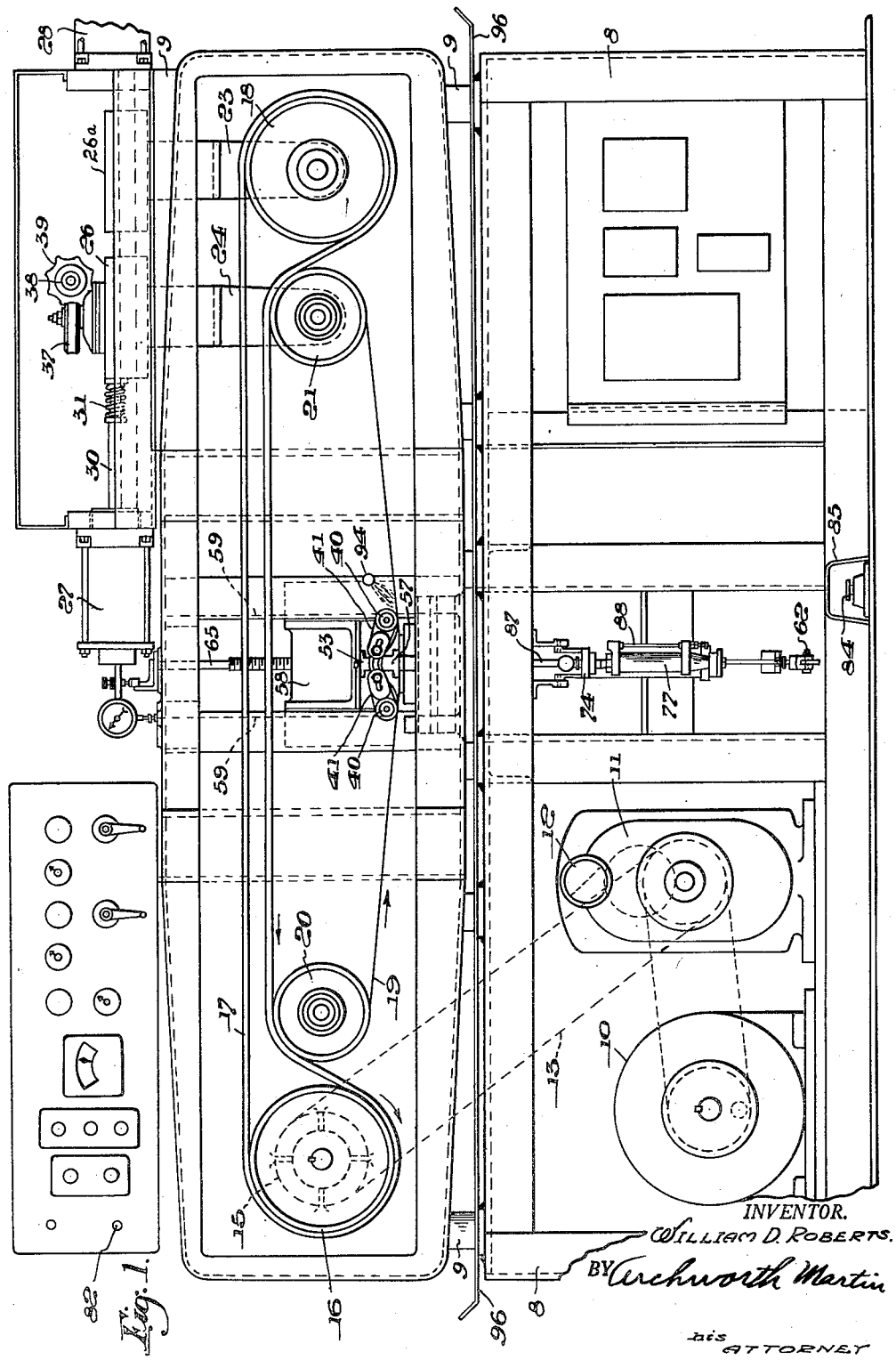

Oct. 26, 1954 W. D. ROBERTS 2,692,460
GRINDING APPARATUS FOR THE TRAVELING BELT TYPE
Filed April 26, 1952 11 Sheets-Sheet 1

INVENTOR.
William D. Roberts.
BY Archworth Martin
his ATTORNEY

Oct. 26, 1954 W. D. ROBERTS 2,692,460
GRINDING APPARATUS FOR THE TRAVELING BELT TYPE
Filed April 26, 1952 11 Sheets-Sheet 2

INVENTOR.
William D. Roberts.
BY Archworth Martin
his ATTORNEY

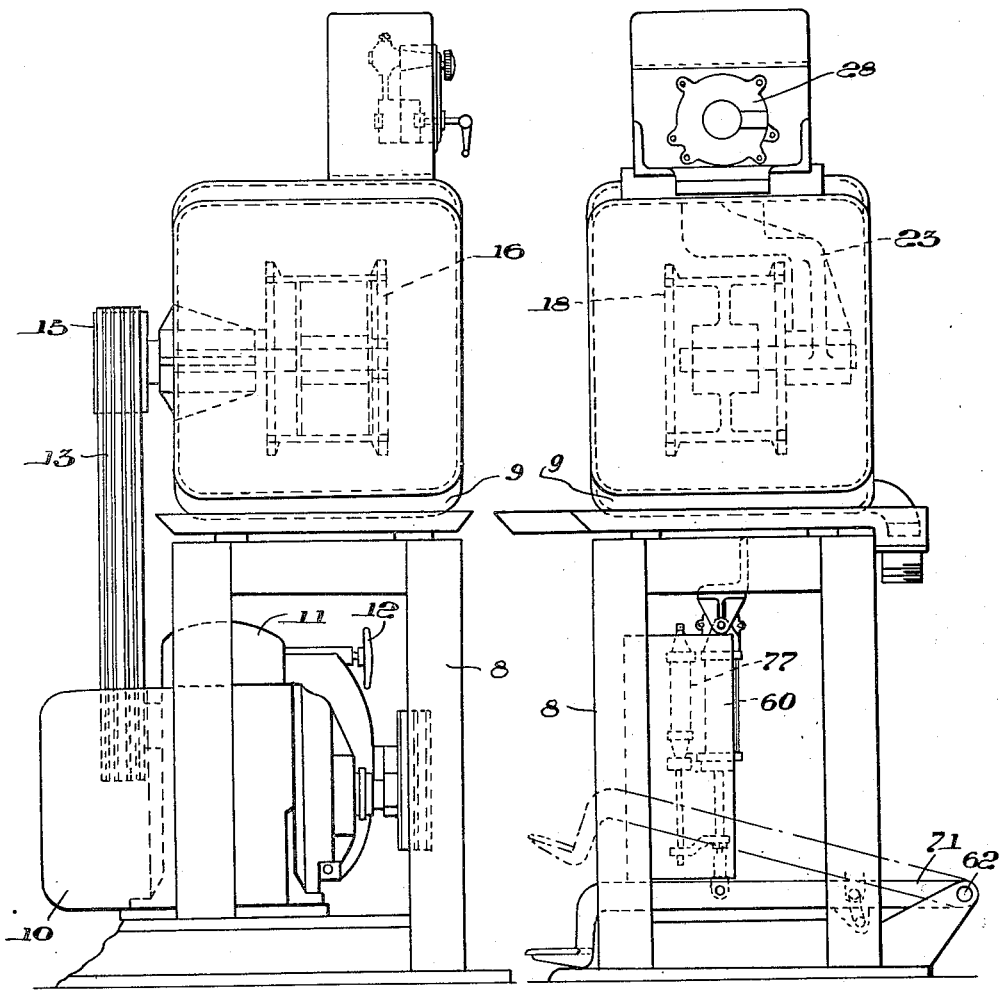

Oct. 26, 1954 W. D. ROBERTS 2,692,460
GRINDING APPARATUS FOR THE TRAVELING BELT TYPE
Filed April 26, 1952 11 Sheets-Sheet 4

INVENTOR.
WILLIAM D. ROBERTS.
BY Archworth Martin
his ATTORNEY.

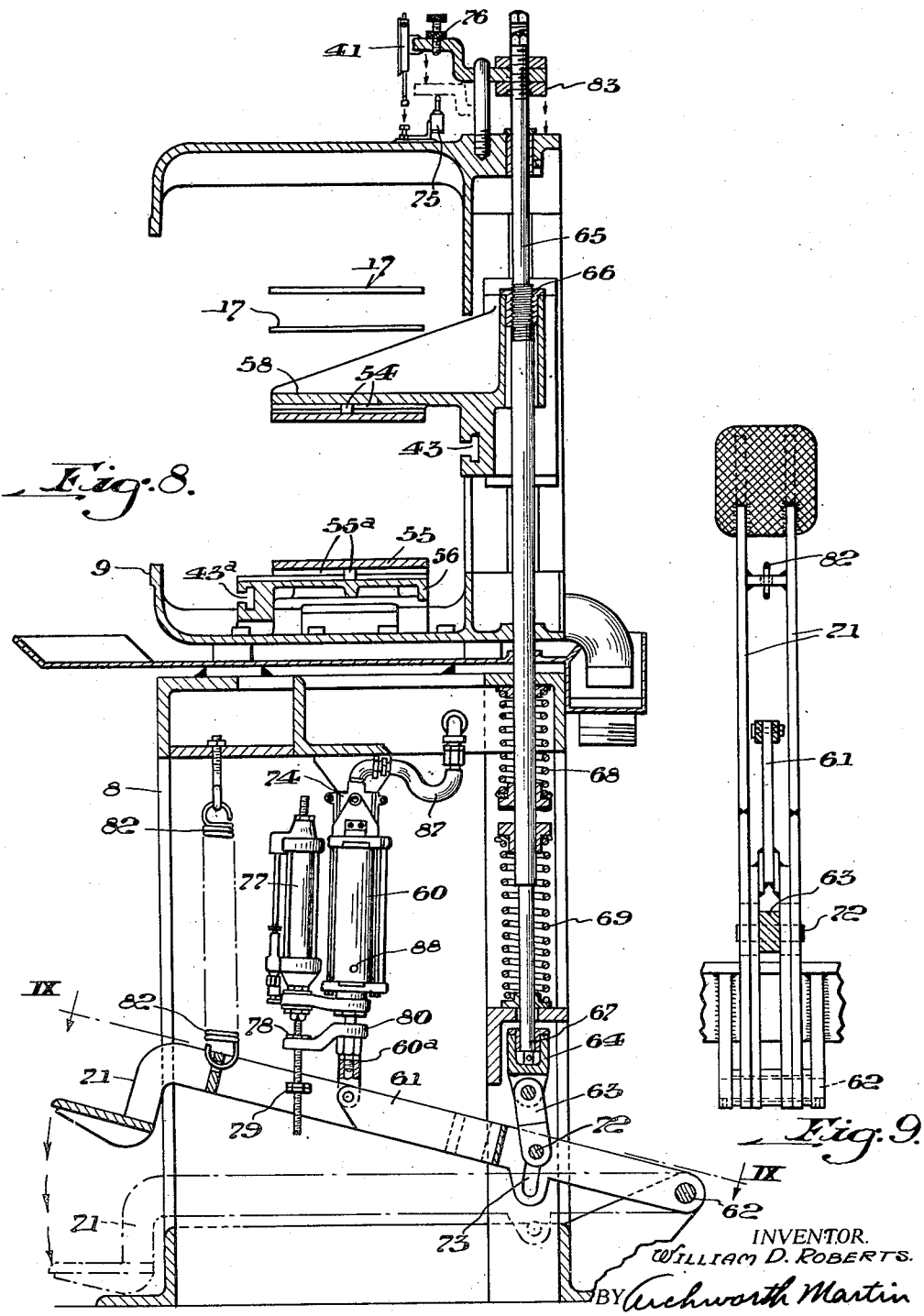

Oct. 26, 1954     W. D. ROBERTS     2,692,460
GRINDING APPARATUS FOR THE TRAVELING BELT TYPE
Filed April 26, 1952                                        11 Sheets-Sheet 6
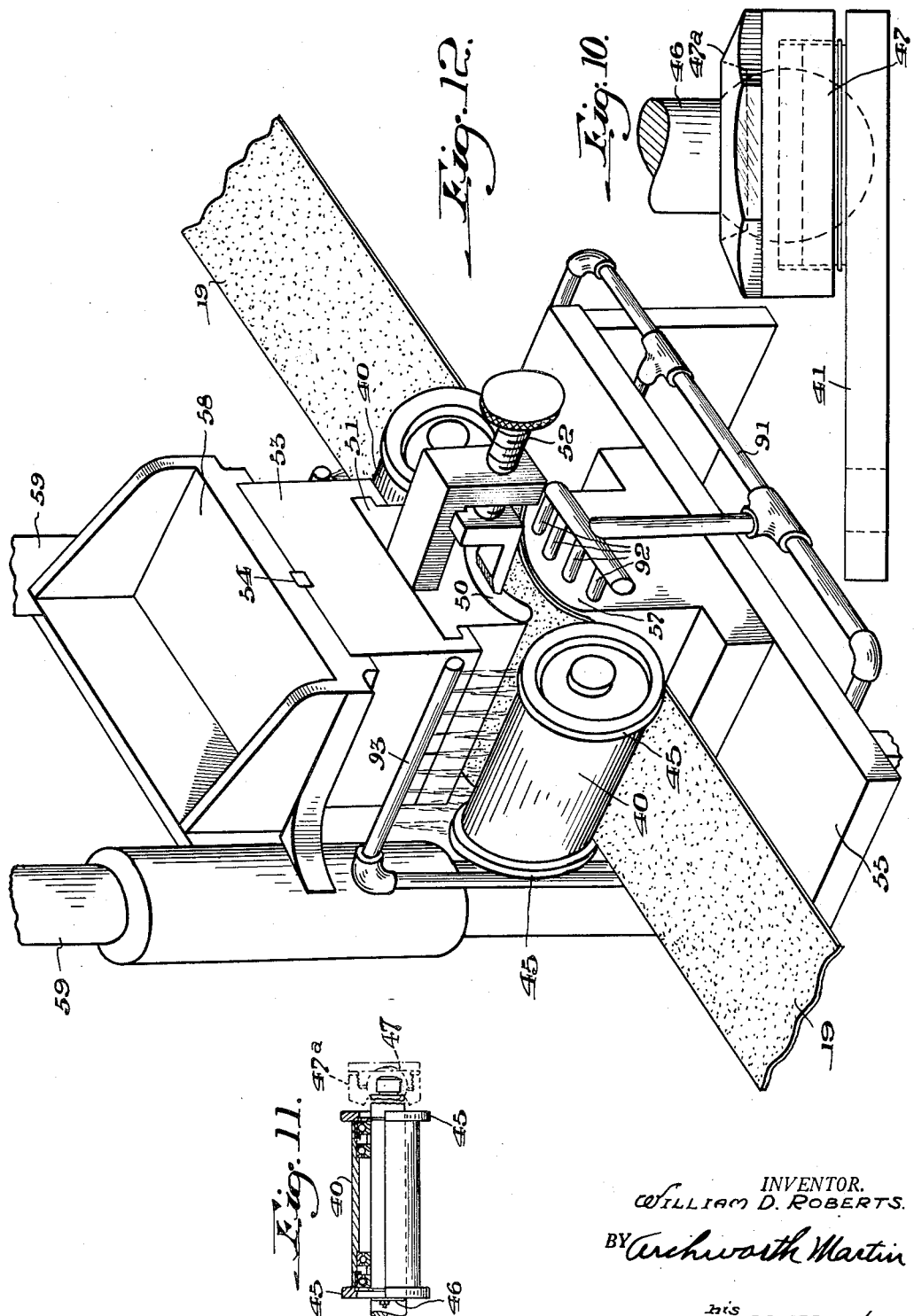
INVENTOR.
WILLIAM D. ROBERTS.
BY Archworth Martin
his ATTORNEY.

Oct. 26, 1954   W. D. ROBERTS   2,692,460
GRINDING APPARATUS FOR THE TRAVELING BELT TYPE
Filed April 26, 1952   11 Sheets-Sheet 8

INVENTOR.
WILLIAM D. ROBERTS.
BY Auchworth Martin
his ATTORNEY.

Oct. 26, 1954 W. D. ROBERTS 2,692,460
GRINDING APPARATUS FOR THE TRAVELING BELT TYPE
Filed April 26, 1952 11 Sheets-Sheet 9

INVENTOR.
WILLIAM D. ROBERTS.
BY Archworth Martin
his ATTORNEY.

Oct. 26, 1954 W. D. ROBERTS 2,692,460
GRINDING APPARATUS FOR THE TRAVELING BELT TYPE
Filed April 26, 1952 11 Sheets-Sheet 10

INVENTOR.
WILLIAM D. ROBERTS.
BY Archworth Martin
his ATTORNEY.

INVENTOR.
WILLIAM D. ROBERTS.
BY Auchworth Martin
his ATTORNEY.

Patented Oct. 26, 1954

2,692,460

UNITED STATES PATENT OFFICE 2,692,460

GRINDING APPARATUS FOR THE TRAVELING BELT TYPE

William D. Roberts, Pittsburgh, Pa., assignor to Ryman Engineering Company, Ellwood City, Pa., a corporation of Pennsylvania Application April 26, 1952, Serial No. 284,556

6 Claims. (Cl. 51—135)

My invention relates to grinding apparatus of the traveling-belt type, and more particularly to that type of apparatus, wherein a surfacing belt is driven by a driver belt, the two belts being mounted on separate pairs of pulleys. However, certain features of the invention are applicable also to the surfacing belt and its associated apparatus, independently of a driver belt.

One object of my invention is to provide a driver belt ararngement of such form that the driver will give more effectively applied driving pressure to the surfacing belt, and will not readily slip on its pulleys and is stiff enough to avoid "pulling in" of its edges under driving stresses, while at the same time having good flexibility.

Another object of my invention is to provide a combined driver belt and sanding belt pulley arrangement, whereby there is such great pressure and tractive force exerted by the driver belt that surfacing belts of greater than usual length can be employed, in that driving tension on the surfacing belt is exerted mainly at remotely-spaced points, and particularly at the surfacing belt pulleys, whereby heavier grinding pressures can be employed.

Still another object of my invention is to provide a combined driver belt and surfacing belt apparatus, wherein the tension of the surfacing belt and the angularity of its pulleys may be changed without affecting the normal operation of the driver belt or its tension.

A further object of my invention is to provide surfacing belt apparatus of such form that belts that extend the full width of the articles to be surfaced can be so controlled and adjusted in their paths of movement past the work holders that they can nevertheless be readily adapted to work pieces that require the finishing of irregular contours or curved surfaces.

Still a further object of my invention is to provide surfacing belt apparatus of such form that not only can the angularity of the path of travel of the belt be changed, but slight deviations from such path will automatically and promptly be corrected to such extent that lateral deviations of the belt at the work-supporting station may be controlled to within .005 inch.

Still another object of my invention is to provide surfacing apparatus of the sanding-belt type, wherein a work holder and a form block are respectively mounted on relatively-movable supports, so that the form block can be caused to deflect the belt into proper engagement with the work piece and wherein the work holder and the form block are respectively interchangeable from one supporting member to the other.

Figure 2:
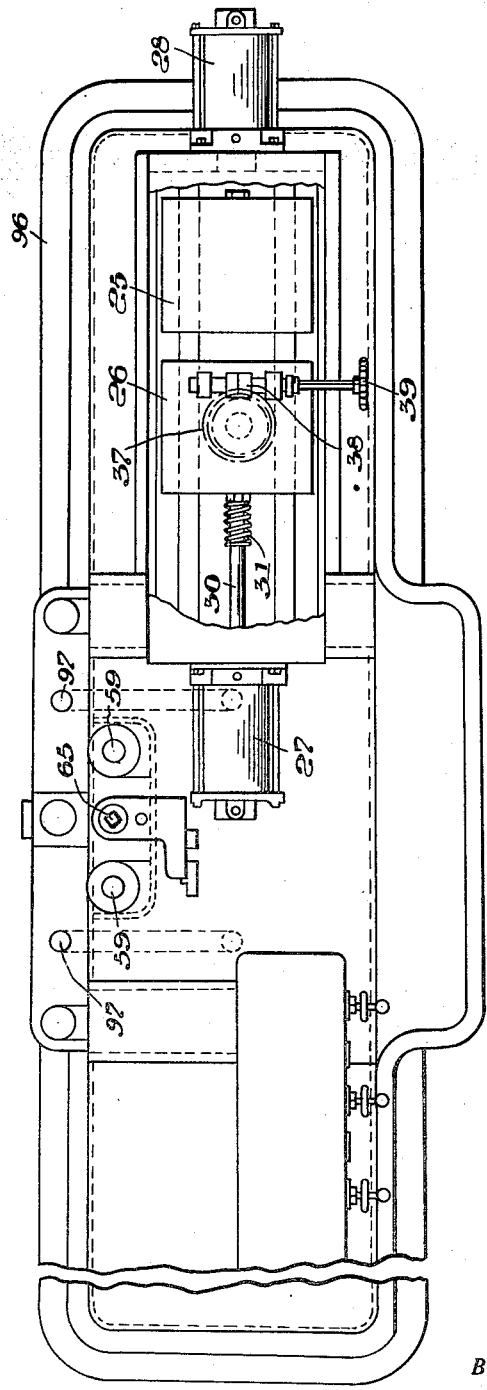
Figure 5:
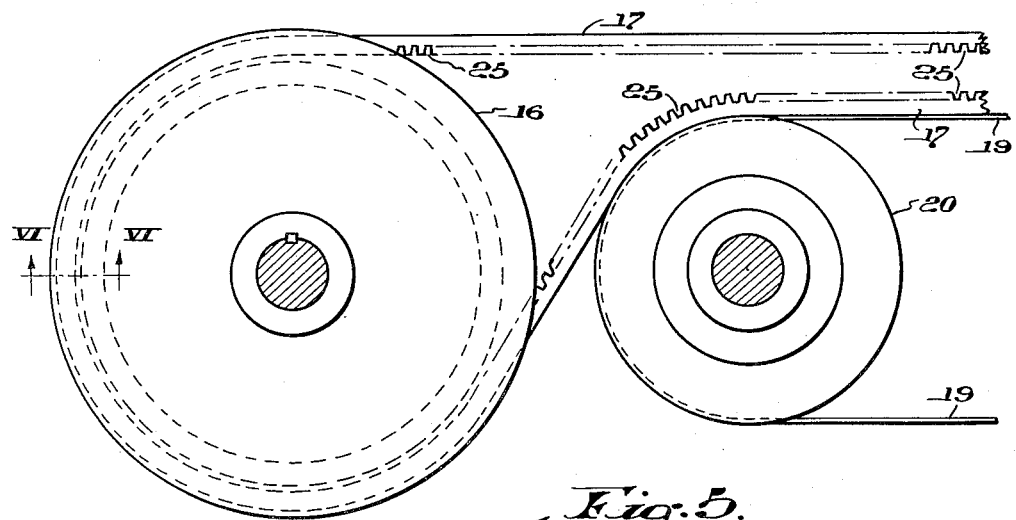
Figure 6:
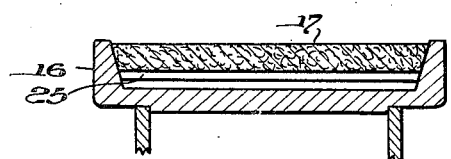
Figure 7:
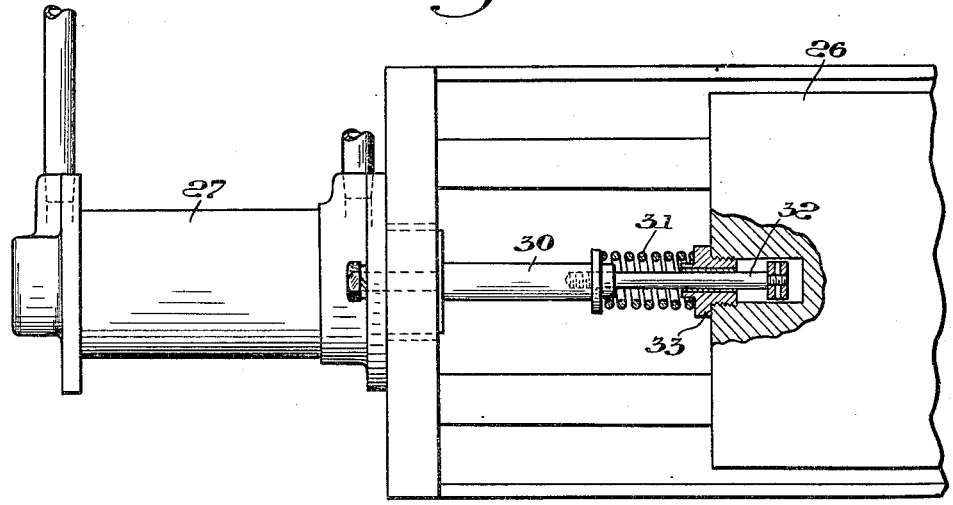
Figure 13:
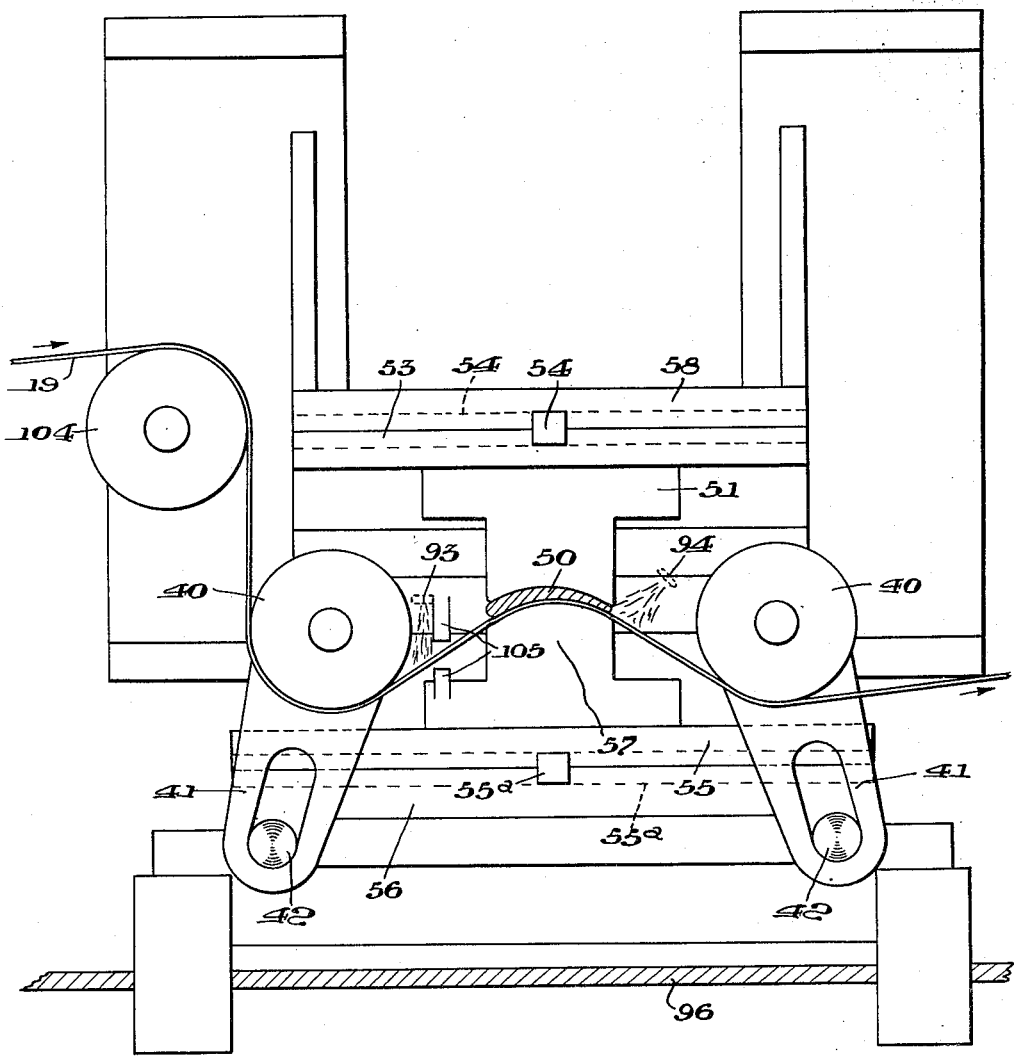
Figure 14:
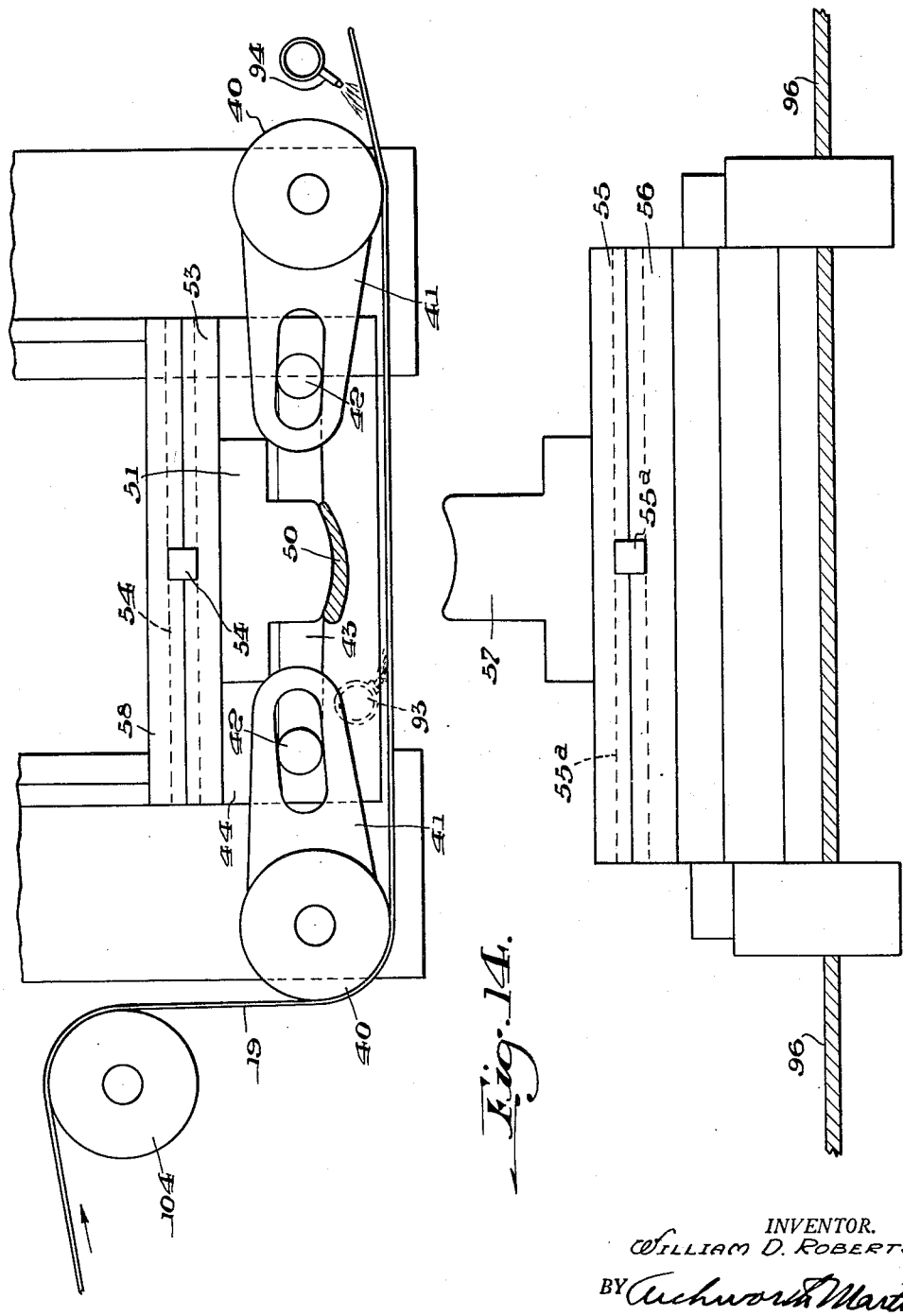
Figure 15:
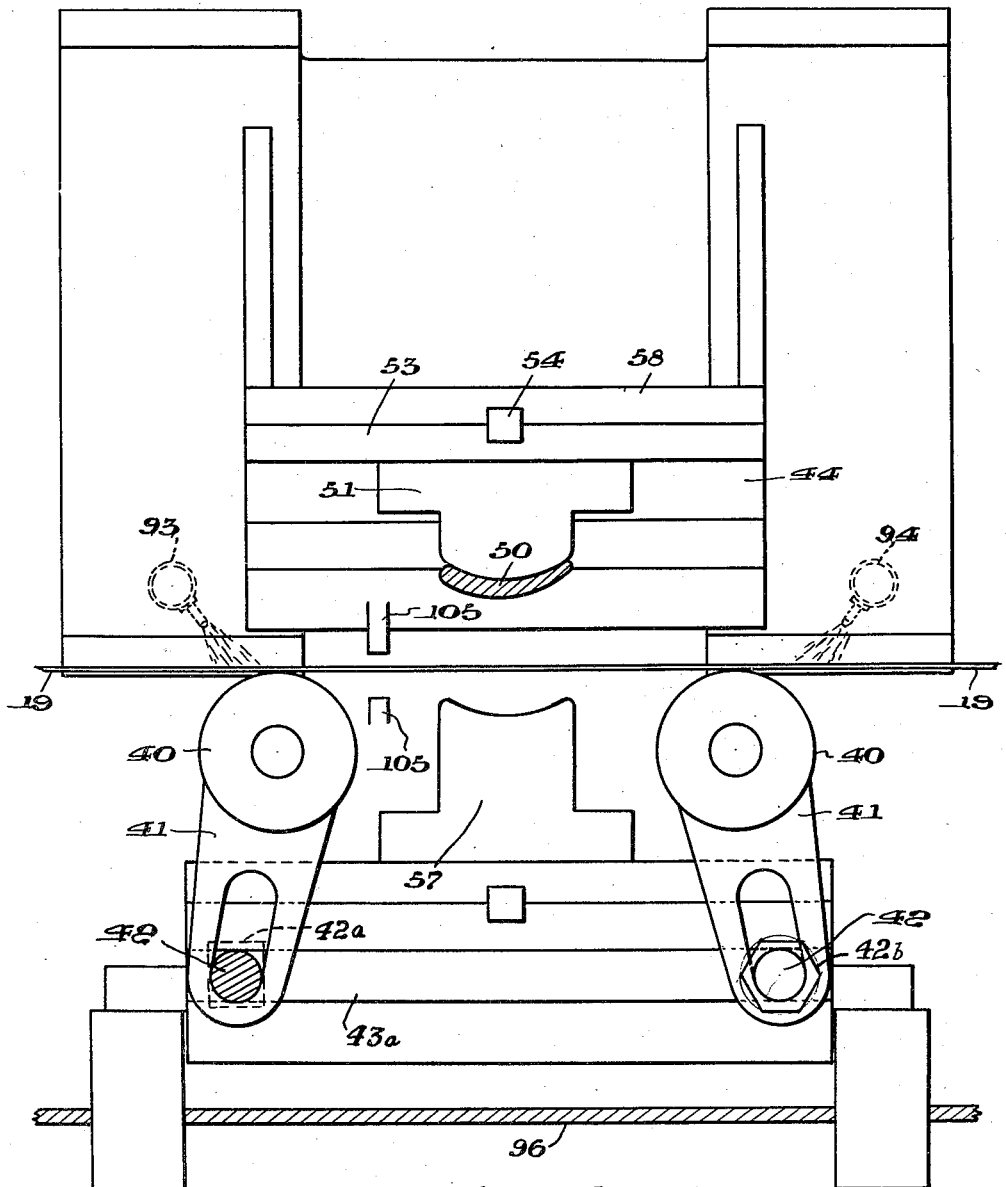
Figure 16:
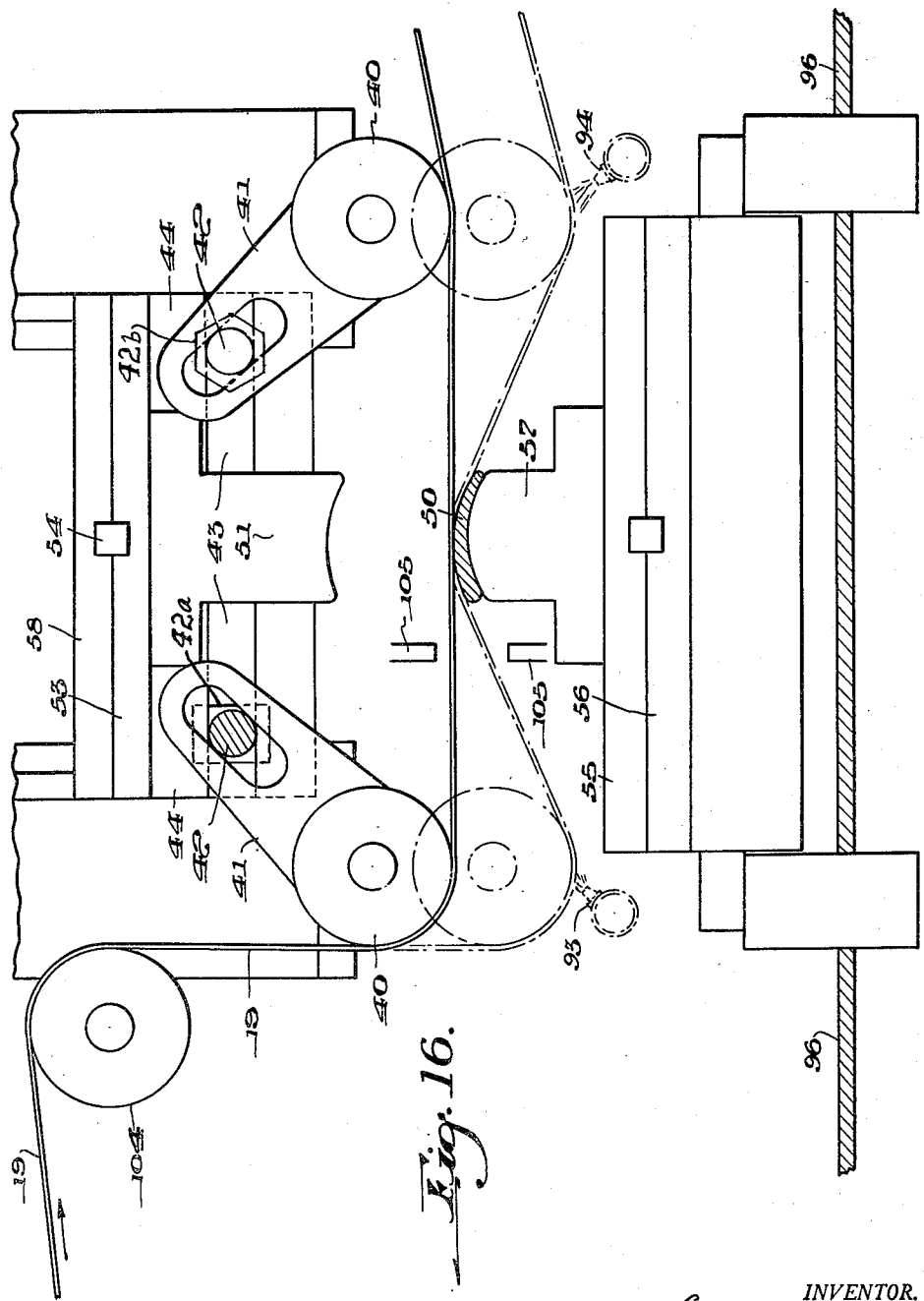
Figure 17:
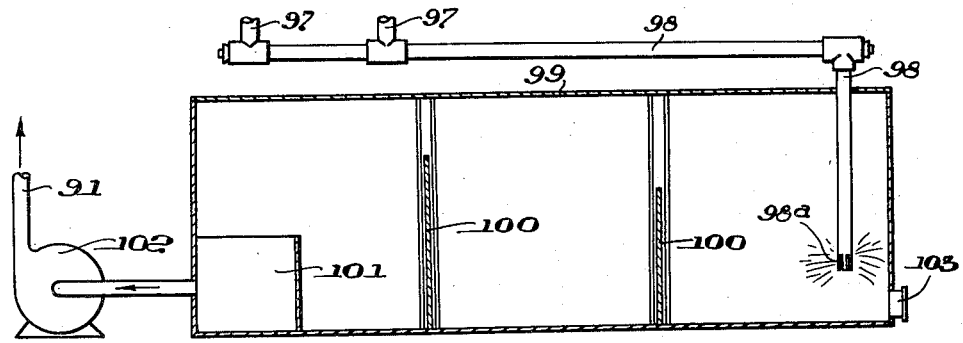
Figures 18, 19:
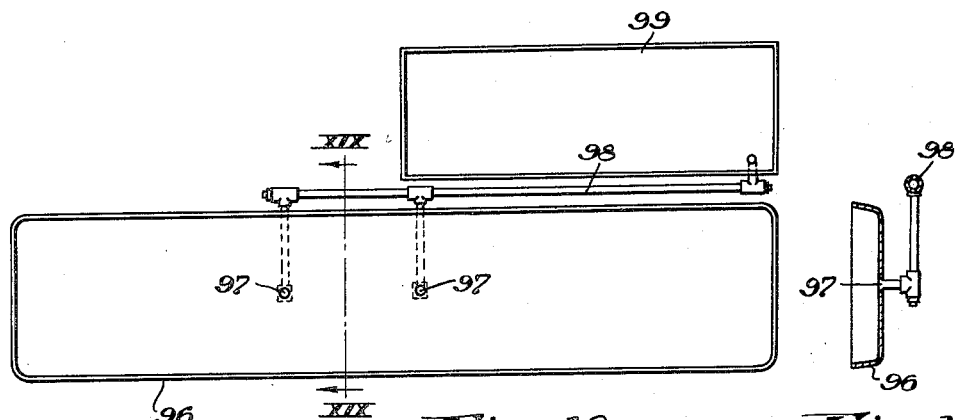
Figures 20, 21, 22:
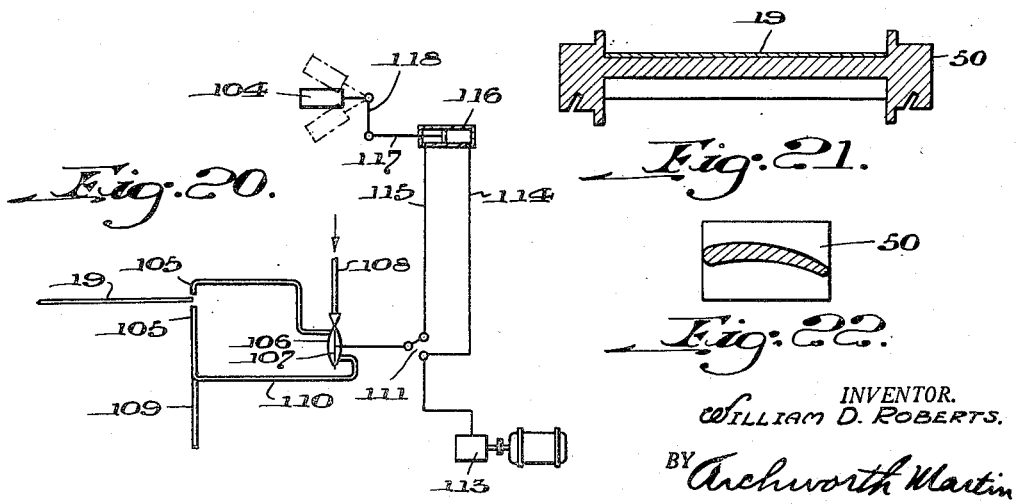

Some of the forms of apparatus that embody my invention are shown in the accompanying drawings, wherein Figure 1 is a side elevational view of the surfacing apparatus and the driving and operating mechanism therefor; Fig. 2 is a plan view, partly broken away, of the structure of Fig. 1; Fig. 3 is a rear end view of the apparatus; Fig. 4 is a front end elevational view thereof; Fig. 5 is an enlarged view showing a particular form of driver belt arrangement, of the V-belt type; Fig. 6 is a view taken on the line VI—VI of Fig. 5;

Fig. 7 is a partial sectional plan view, on an enlarged scale, of a portion of the apparatus of Fig. 2; Fig. 8 is a vertical sectional view through the apparatus of Fig. 1, but with the upper portion of the operating mechanism omitted; Fig. 9 is a view taken on the line IX—IX of Fig. 8; Fig. 10 is an enlarged view showing the manner in which the shafts for the belt-guiding rollers of Fig. 1 are mounted for universal adjustment on their supporting brackets; Fig. 11 is a view showing details of structure of the guiding rollers;

Fig. 12 is a perspective view, on an enlarged scale, of a portion of the structure shown in Fig. 1, with certain of the parts in greater detail;

Fig. 13 is a view showing a modification of the belt-guiding members of Fig. 1; Fig. 14 shows still another arrangement thereof; Figs. 15 and 16 show still other arrangements, together with scanning tubes for correcting or preventing lateral deviations of the surfacing belt; Fig. 17 is a vertical sectional view of a part of the coolant liquid system, including the sediment tank and the circulating pump; Fig. 18 is a plan view showing the relation of the coolant tank of Fig. 17 to the drain pan positioned under the grinding elements of Fig. 1; Fig. 19 is a view taken on the line XIX—XIX of Fig. 18;

Fig. 20 is a schematic or diagrammatic view showing the manner in which the scanning tubes of Figs. 15 and 16 are utilized to control or guide the surfacing belt movements, and Figs. 21 and 22 are longitudinal sectional and cross sectional views, respectively, of one type or shape of workpiece for which my machine is especially adapted.

The working parts of the apparatus are shown as mounted upon a lower frame 8 and an upper framework 9 that is supported upon the lower frame. A motor 10 is mounted in the lower frame and drives a speed change gearing at 11, which has a manual control 12. A belt 13 drives a pulley 15 which is secured to a shaft that carries a pulley 16 for a belt 17 that passes around an idler pulley 18. The belt 17 and its pulleys are of a modified V-belt type drive. The belt 17 serves as a driver for an abrasive belt 19 that is here shown as containing abrasive grains on its inner surface and extends around idler pulleys 20 and 21.

An important feature of my invention resides in the provision of means for preventing creeping of the abrasive belt 19 in edgewise directions on its pulleys, to thereby insure that the work pieces will be accurately ground to contour. To this end, the driver belt 17 and its pulleys are of a modified V-drive type (Fig. 6), so that there will be no lateral shifting of this driver belt, as such shifting would tend to also shift the abrasive belt 19 with which the driver belt has frictional engagement. The flanges on the pulleys 16 and 18 prevent lateral shifting of the belt 17. The belt 17 may suitably be of rubber and fabric, and must be much more flexible than an ordinary V-belt. At the same time, it must have sufficient depth or thickness that it will not bend or deform along longitudinal lines, particularly at points between the flanges of the pulleys 16—18. Therefore, the belt is provided with what is, in effect, a series of ribs 25 shown more clearly in Figs. 5 and 6 that will not seriously interfere with flexure of the belt in passing around the various pulleys, and at the same time, will have sufficient thickness and edgewise contact with the pulley flanges that danger of slipping, particularly in the case of the drive pulley 16, will be avoided, and there is no sanding belt slippage when starting.

The driving belt pressures are more particularly applied against the surfacing belt at the pulleys 20 and 21 which are, of course, remote from one another, so that frictional stress or drag on the surfacing belt is not at such a restricted area as would be the case if the driving belt 17 engaged the surfacing belt at only one of the pulleys 20 or 21. By this arrangement, it is possible to use belts of perhaps double the length than would otherwise be possible. For example, where there is restricted frictional driving area, a surfacing belt of perhaps only 6 feet in length could be used, whereas by the present arrangement, I can use a 12-foot belt. Also, heavier grinding pressures can be used with less danger of tearing the surfacing belt, because of this extended area of frictional drive.

The shafts for the pulleys 18 and 21 are mounted in hangers 23 and 24 respectively, that serve as bearing brackets for the pulleys and are suspended from base blocks 25 and 26 that are slidably mounted upon the upper framework 12. Cylinders 27 and 28 are mounted upon the upper framework and have pistons that are connected to the base blocks, to shift said blocks in directions to vary the tension on the belts 17 and 19. The piston rod 30 of the cylinder 27 (Figs. 1 and 7) has lost-motion connection with the block 26 through a spring 31 that will be compressed somewhat when the hanger 24 is shifted in a direction to tighten the sanding belt 19. The piston in the cylinder 28 has connection with the block 26a, so that fluid pressure can be admitted to the cylinder, to maintain the tension on the belt 17.

When the piston rod 30 moves to shift the slide 26, it will telescope slightly on the extension 32 that is slidable in a gland 33. If now the sanding belt is deflected somewhat to the contour of a workpiece thus tending to change the distance between the pulleys 20—21 and drawing the pulleys toward one another, the spring 31 is compressed to maintain working tension on the belt, and if there is a lengthening or stretching, the spring will take up the slack.

Belt guiding rolls 40 are journaled in brackets 41, and these are carried by bolts 42 (Figs. 13–16) and are slotted for adjustment longitudinally to adjust the positions of the rolls horizontally. The heads 42a of the bolts 42 (Fig. 16) extend into T-slots 43 in a platen 44 that is fixedly mounted on the machine frame. Clamping nuts 42h hold their brackets in their adjusted position. Each roll is provided with a pair of end flanges 45 (Fig. 11) that have ball bearings carried on the roll shaft 46 relative to the roll 40. Therefore, if the belt 19 shifts edgewise into engagement with one or the other of the flanges 45, the flanges being idle to the roll 40, will rotate with the belt and thereby avoid fraying of the edges, and the belt will not cut into the flanges. The shaft 46 of each of these pulleys has a ball-and-socket mounting at 47 with the bracket 41, thus permitting the rolls to have universal adjustment for adaptation to changes in die contours and thereby assist in properly maintaining the belt in engagement with the contoured surfaces. Clamping rings 47a rigidly hold the pulleys in their adjusted positions.

As shown in Figs. 12 and 13, the work piece is represented by the numeral 50 and is releasably held on a work holder slide 51 by a clamping screw 52. This slide 51 is slidable in a die base 53, and will be removed from the machine when engaging and disengaging the work piece with this work holder. Aligning slots and keys 54 insure alignment of the members 58 and 53.

A lower die holder plate 55 has slots on its underside for engagement with keys 55a that are carried by a platen 56, to thus insure that the plate will be held in proper position and in proper alignment with the ram.

A form block or die 57 is removably mounted on the die holder 55. Its upper surface conforms to the contour desired on the finished work piece which is here shown as a blade for a turbine. The work holder 53 is carried by a vertically reciprocable ram 58 that is slidable on vertical guides 59.

An important feature of my invention is the provision of a machine which is adaptable to the grinding of either convex or concave work pieces such as 50, which is here shown as a vane for turbines. Figs. 1, 12 and 13 show the parts arranged for grinding the concave faces of these vanes, while in Figs. 14, 15 and 16, the parts are set up for grinding the convex faces. In these figures, that side of the abrasive belt which engages the convex surface of the work piece, of course, carries the abrasive. In Figs. 14 and 15, it will be the upper or inner face of the belt 19, while in Fig. 16, the undersurface of the belt will carry the abrasive. In both Figs. 14 and 16, the bolts 42 for adjustably supporting the guide roller bracket 41 are carried by the upper vertically-reciprocable ram 58, and when the ram is brought down, the abrasive belt will be deflected to the contour of the work piece as shown by the dash lines in Fig. 16.

In Fig. 15, these supporting T-head bolts 42 are carried by the lower platen 56, in slot 43a (Fig. 8), as is also the case in Fig. 13. Thus, when it is desired to change from the grinding of the concave surface to the grinding of convex surfaces, it is necessary only to apply the work pieces to a convexly-faced slide such as 51 of Fig. 15 or 57 of Fig. 16, holding it there with a clamp such as the clamping screw 52 of Fig. 12.

Holders and blocks 51 and 57 will be of various forms, and shifted as may be required, to suit various classes of work and convex or concave work.

The ram 58 is reciprocated vertically by an air motor 60 whose piston rod is connected through a coupling 60a to a lever 61 pivoted to a fixed point 62. A link 63 connects the lever 61 to a coupling member 64 on the lower end of a pull rod 65. The rod 65 has screw threaded connection with the ram 58, so that when the rod is reciprocated vertically to bring the work holder down into operative position, the ram 58 will be moved up and down to thereby bring the work holder into and out of operative engagement with the sanding belt. In order to effect vertical adjustments of the ram 58, the rod 65 will be rotated at its screw-threaded connection 66 to effect relative shifting of the ram, the lower end of the rod having a swivel connection at 67 with the coupling member 64. A coil spring 68 is provided to cushion upward strokes of the rod 65 under the action of the air motor 60, while a spring 69 cushions downward movements and also serves to counterbalance the weight of various parts connected with the rod 65.

A foot pedal lever 71 is provided primarily for die setting. It is pivotally mounted at 62, and, through a pin 72, has pivotal connection with the link 63. The piston-operated lever 61 also is pivotally connected to the link 63, and by reason of a slot 73 in the lever 71, the lever 61 can be moved down by the cylinder 60 independently of the lever 71 for the actual grinding operation. Thus when the lever 71 is depressed by its foot pedal to bring the work and the former in approximately operative position, the circuit through an electro-magnetically-operated valve 74 is completed by a micro-switch 75 that controls a reversing switch (not shown) and is closed by a stud 76, to thereby move the valve 74 in a direction to admit pressure to the upper end of the cylinder 60, so that the lever 61 will be moved downwardly and there will be further downward movement of the ram 68 and a desired degree of grinding pressure will be exerted, through the pressure in the cylinder 60.

Reversal of this grinding pressure is effected through raising of the rod 65, and consequent opening of the switch 75, will result in reverse operation of the valve 74, to direct pressure into the lower end of the cylinder 60.

A dash pot 77 has its piston rod threaded for connection to stop nuts 78 and 79 between which a suitable bar 80 loosely moves by reason of its rigid connection to the piston rod of the cylinder 60. Thereby, too rapid movements and shocks that result from operation of the piston in the cylinder 60 are avoided.

For manual operation, the lever 71 is depressed to pull down the rod 65. The pneumatic motor 60 is first de-energized by throwing a toggle switch 82, so that at the end of the down stroke, there will be no idling operation of the motor.

The ram 58 moves the top die 57 down into engagement with the upper smooth side of the belt. A stop 83 limits this downward movement so as to prevent excessive grinding of the work. The die 57 of course, flexes the belt to the contour desired for the work piece.

For automatic operation, the toggle switch 82 is closed to partially complete the circuit through the magnet of valve 74. An operator will step on the push-button type switch 84 (Fig. 1) which is protected by a guard 85 to complete the circuit through the electro-magnet that operates the valve 74. The energized magnet therefor operates the valve to admit pressure through a pipe 87 to the upper side of the piston or diaphragm at 60, to thereby move the coupling member 60a and the lever 61 downwardly and thus effect downward movement of the rod 65 to bring the ram 58 and the die 57 down for a grinding operation.

At the lower end of this stroke, the switch 75 is closed by the screw 76 to operate a reversing switch that directs pressure from the line 87 through a port at 88 to the underside of the air motor. The ram 58 is therefore returned to its upper position.

In order to prevent overheating of the various parts through friction and to clean the belt of loose abrasive and metal particles, I provide a line 91 through which a coolant liquid is pumped under pressure to pipes 92 in the form block, and having branches at 93 and 94. The spray nozzle at 93 (Figs. 14 and 16) applies liquid to the belt as it enters into engagement with the work piece and the spray at 94 is directed somewhat counter to the movement of the belt for forcably removing loose particles of metal and abrasive, so that the belt will not become loaded so quickly.

The coolant liquid when other than pure water, as will usually be the case, is somewhat expensive, and as a matter of economy, it is reused. To this end, a pan 96 is positioned beneath the grinding apparatus to catch the liquid after it leaves the grinding apparatus. The liquid will move through drain pipes 97 and 98 into a tank 99, wherein the solids will be permitted to settle out of the liquid. The vertical pipe 98 is closed at its lower end, but has slots or holes at 98a for lateral discharge of the liquid. To this end, the tank (Figs. 17 and 18) is provided with baffle plates 100 and a compartment 101 connected with the suction line of a pump for delivery under pressure to the line 91 that leads to the sprays. The baffles 100 are vertically slidable and can be lifted to permit use of a scraper to clean out the sediment, through a gate 103.

Because of the relatively long distance between the pulleys 20 and 21, that conduces toward lateral deflections of the belt, I may provide guide rolls 104 in addition to the rolls 40. This guide roll 104 assists in maintaining the sanding belt 19 in proper longitudinally-aligned position as it enters beneath the first roll 40.

In order to further insure that the sanding belt will "track" properly with respect to the work piece, I show scanning tubes 105 (Fig. 13) which may, of course, also be used in conjunction with the grinding station of Fig. 1, to automatically maintain the belt in its proper path. These tubes may be of the photoelectric-cell type or of the fluid-pressure type, wherein flow of fluid pressure to an aligning motor for the pulley 104 will be automatically controlled. For example, if the belt edge intercepts the line of communication between the upper and lower tubes 105 at one edge, the pulley 104 will be angularly shifted to restore the belt to a precise path. However, these devices are well known of the art and form no part of the present invention and therefore need not be described in detail.

In Fig. 20, I show a schematic arrangement of fluid-pressure device for correcting lateral deviations of the belt 19. The tubes 105 past which the belt 19 moves have connection with opposite sides of a diaphragm casing 106 that contains a diaphragm 107. A pipe 108 leads from a source of fluid pressure into the diaphragm casing, the flow of air being about evenly divided between opposite faces of the diaphragm. A pipe 109 leads from another source of fluid pressure, and has connection with a line 110 that leads to one side of the diaphragm.

When the diaphragm 107 is flexed as hereinafter explained, it operates a two-way valve 111 to direct pressure from a pump 113 through either a line 114 or 115 to a cylinder 116 whose piston rod 117 has connection with a bell-crank lever 118 that carries the roller 104, so that as pressure is admitted to one end or the other of the cylinder 116, the angularity of the roller 104 will be changed to thereby cause some lateral shifting of the sanding belt.

When the sanding belt 19 is in the position shown in Fig. 20—about midway across the open ends of the tubes 105, a balanced condition will exist. If the belt shifts somewhat to the left, there will be pressure directed into the left-hand side of the diaphragm, from pipe 109 and through the tubes 105. This results in shifting the valve 111, so that the guide roller 104 is tilted to restore the belt to its normal position. If the belt shifts to the right, thus more fully intercepting flow from the pipe 109, more of that flow will be directed into the right hand side of the diaphragm casing. Thus, it causes the diaphragm to shift the valve 111 in the opposite direction and effect tilting of the roller 104, so as to restore the belt to its normal path of travel.

The use of the scanning tube arrangement, whether of the pneumatic-pressure type as shown in Fig. 20 or of the photoelectric-cell type facilitates the use of full width belts on work pieces, thus avoiding reciprocatory lateral movement of the belt on the work, but also more effectively prevent over-grinding of surfaces at the edges of the belt. For example, as shown in Fig. 21, the scanning tube will prevent the edges of the belt from excessive grinding of the angularly disposed surfaces with which they come in contact. In the case of vanes for turbines, the permissible tolerance must frequently be maintained within .005 inch plus or minus.

Also, the use of the guide roller 104 facilitates the employment of longer sanding belts, since it helps to correct or limit sag which tends to occur in the surfacing belt between the pulley 20 and the guide roller 40.

Another important feature of my invention is the provision of an arrangement whereby the forming blocks or dies can be reconditioned or initially shaped to the exact contours required on the finished articles. For example, in the case of Fig. 14, the die face of the block 47 may become worn to not exactly the shape desired for work pieces 50. In such case, the sanding belt 19 will be reversed to bring the surfacing material to the outer face thereof, so that when the ram is lowered, a master work piece 50 will cause the belt to grind the work surface of the die 57 to the exact shape required.

Similarly, where the work carrier is below the master die as in Fig. 16, the surfacing belt will be turned with its abrading surface on its inner face, so that when the members 51 and 57 are brought together, the die face will be properly shaped.

I claim as my invention:

1. A surfacing machine of the sanding belt type, comprising a pair of relatively-spaced pulleys, a surfacing belt supported thereby, a driver belt, and pulleys for the driver belt spaced farther apart than the surfacing belt pulleys and in partly opposed relation thereto at the remote faces of the surfacing belt pulleys, whereby one run of the driver belt is held deflected toward the other run thereof, and in partly embracing relation to the surfacing belt and its pulleys.

2. A surfacing machine of the sanding belt type, comprising a pair of relatively-spaced pulleys, a surfacing belt supported thereby, a driver belt frictionally engaging an exposed face of the surfacing belt throughout approximately the entire distance between the said pulleys, and pulleys for the driver belt, the driver belt and its pulleys being of the V-belt drive type, and the driver belt having transversely-extending ribs at pulley-engaging surface, to stiffen it against flexing about its longitudinal axis and their ends having driving engagement with the pulley faces.

3. A surfacing machine of the sanding belt type, comprising a pair of relatively-spaced pulleys, a surfacing belt supported thereby, a driver belt frictionally engaging an exposed face of the surfacing belt throughout approximately the entire distance between the said pulleys, a movably-mounted bearing for one of the surfacing belt pulleys, a pressure-actuated piston for shifting the bearing in a direction to maintain the surfacing belt under tension, and a spring interposed between the piston and the bearing to provide yieldable engagement between the piston and the bearing.

4. A surfacing machine of the sanding belt type, comprising a pair of relatively-spaced pulleys, a surfacing belt supported thereby, a driver belt frictionally engaging an exposed face of the surfacing belt throughout approximately the entire distance between the said pulleys, a movably mounted bearing for one of the sanding belt pulleys, a pressure-actuated piston for shifting the bearing in a direction to maintain the sanding belt under tension, a spring interposed between the piston and the bearing to provide yieldable engagement between the piston and the bearing, and means for adjusting the said bearing to change the angular position of its pulley relative to the other surfacing belt pulley.

5. A surfacing machine of the sanding belt type, comprising a pair of relatively-spaced pulleys, a surfacing belt supported thereby, a movable bearing for one of the pulleys, a pressure-actuated piston for shifting the bearing in a direction to maintain the belt under tension, a spring interposed between the piston and the bearing to provide yieldable engagement between the piston and the bearing, and means for adjusting the said bearing to change the angular position of its pulley relative to the other pulley.

6. A surfacing machine of the sanding belt type, comprising a pair of relatively-spaced pulleys, a surfacing belt supported thereby, a driver belt frictionally engaging an exposed face of the surfacing belt throughout approximately the entire distance between the said pulleys, a movably-mounted bearing for one of the sanding belt pulleys, a pressure-actuated piston for shifting the bearing in a direction to maintain the sanding belt under tension, a spring interposed between the piston and the bearing to provide yieldable engagement between the piston and the bearing, means for adjusting the said bearing to change the angular position of its pulley relative to the other surfacing belt pulleys, and scanning tubes of the photoelectric cell type, for automatically shifting the surfacing belt to correct any deflection thereof from a predetermined path of travel.

References Cited in the file of this patent

UNITED STATES PATENTS

| Number | Name | Date |
|---|---|---|
| 975,166 | Sellner | Nov. 8, 1910 |
| 1,043,194 | Blevney | Nov. 5, 1912 |
| 1,244,310 | Freeman | Oct. 23, 1917 |
| 1,656,958 | Seel | Jan. 24, 1928 |
| 1,791,288 | Schweitzer | Feb. 3, 1931 |
| 1,972,075 | Clark | Sept. 4, 1934 |
| 2,171,799 | Kline | Sept. 5, 1939 |
| 2,171,892 | Richardson | Sept. 4, 1939 |
| 2,274,268 | Hercik | Feb. 24, 1942 |
| 2,279,782 | Fowler | Apr. 14, 1942 |
| 2,479,506 | Payton | Aug. 16, 1949 |
| 2,575,656 | Coe et al. | Nov. 20, 1951 |